United States Patent [19]
Palmers

[11] 3,948,433
[45] Apr. 6, 1976

[54] PROCESS FOR THE MANUFACTURE OF A GLAZING UNIT

[75] Inventor: Gerard Palmers, Lommel, Belgium
[73] Assignee: Glaverbel-Mecaniver, Belgium
[22] Filed: Feb. 6, 1973
[21] Appl. No.: 330,096

[30] Foreign Application Priority Data
Feb. 11, 1972   Luxemburg............... 64769/72

[52] U.S. Cl. ............... 228/230; 219/10.53; 219/85; 228/122; 228/125; 228/208; 228/903
[51] Int. Cl.² ........................................ B23K 31/02
[58] Field of Search ........... 29/473.1, 503; 228/122, 228/125, 208, 209, 210, 230, 231, 903; 219/10.53, 85 A

[56] References Cited
UNITED STATES PATENTS

| | | | |
|---|---|---|---|
| 2,469,392 | 5/1949 | Jones et al. | 29/503 |
| 2,577,306 | 12/1951 | Browne | 29/473.1 X |
| 2,870,532 | 1/1959 | Young | 29/503 X |
| 3,136,032 | 6/1969 | Berndsen | 29/473.1 X |
| 3,267,569 | 8/1966 | Eicthorn et al. | 29/473.1 X |
| 3,293,065 | 12/1966 | Roetter | 29/473.1 X |
| 3,323,204 | 6/1967 | Goeckel et al. | 29/473.1 |
| 3,543,385 | 12/1970 | Javaux et al. | 29/503 X |
| 3,648,915 | 3/1972 | Leibfried et al. | 29/503 X |

FOREIGN PATENTS OR APPLICATIONS
19,215   7/1913   United Kingdom............ 29/503

Primary Examiner—Ronald J. Shore
Attorney, Agent, or Firm—Cushman, Darby & Cushman

[57] ABSTRACT

A process for manufacturing a glazing unit by jointing a metallized margin of a sheet of glass to an intervening spacer strip following a course along the peripheral margin of the unit, the joint between the sheet and the strip along at least a section of such course being formed by applying molten solder into the corner angle between the sheet and the strip to form a solder bead along the section, the joint being progressively traversed by at least one flame so that at each moment during its progress along the joint such flame acts on such solder metal before it has completely solidified whereby the final bead is formed by solidification of solder metal from the molten condition in which it is left by such flame and apparatus for carrying out such process.

7 Claims, 7 Drawing Figures

PROCESS FOR THE MANUFACTURE OF A GLAZING UNIT

This invention relates to a process for manufacturing a glazing unit by jointing metallized margins of sheets of glass to an intervening spacer strip or strips following a course along the peripheral margin of the unit, the joint between at least one of said sheets and the or at least one said strip along at least a section of such course being formed by applying solder into the corner angle between such sheet and said strip to form a solder bead along such section.

When making glazing unit joints as above referred to it is of great importance for the joints to be of good quality in order that the unit shall have the required mechanical strength. In the case of hermetically sealed units the joints have moreover to be gas-tight. The formation of a joint of high quality involves the production in the corner angles between the glass sheets and the spacer strip or strips of solder beads which are homogeneous and of correct regular shape, preferably with an exposed surface which merges tangentially with the faces defining the corner angle.

In the known processes the solder beads are formed and finished by means of a soldering iron. Usually the bead formed by a first pass of the soldering iron is not fully satisfactorily in form and the bead has to be improved by one or more further passes of the iron accompanied by the feed of further solder metal together with soldering flux which is necessitated by the occurrence of oxidation of the solder laid in the previous pass.

The present invention aims to provide a process whereby solder beads of high quality can be more easily and reliably formed and achieves this object by subjecting the deposited solder to the action of a flame at a critical stage at which the final form of the bead is determined.

A process according to the invention for manufacturing a glazing unit by jointing metallized margins of sheets of glass to an intervening spacer strip or strips following a course along the peripheral margin of the unit, the joint between at least one of said sheets and the or at least one said strip along at least a section of such course being formed by applying solder into the corner angle between such sheet and said strip to form a solder bead along a said section, is characterized in that the joint angle is provided with molten solder metal and the joint is progressively traversed by at least one flame so that at each moment during its progress along the joint such flame acts on such solder metal before it has completely solidified whereby the final bead is formed by solidification of solder metal from the molten condition in which it is left by such flame.

The use of a flame in accordance with the invention simplifies the task of producing a bead having the form required for a mechanically strong and air-tight joint. The repeated passing of a soldering iron along a deposit of solder in order to create a bead of the required characteristics is very time consuming and the finishing pass of the soldering iron has in particular to be performed by skilled labor or under skilled supervision because the final shaping of the bead and its anchorage to the faces defining the corner angle are substantially dependent on the way in which the soldering iron is manipulated. By finishing the joint by means of a flame or flames (hereafter called "finishing flame(s)") in accordance with the invention it is easily possible to form solder beads of the required quality automatically or by a mechanized process or at least with less expensive supervision.

While the process can be and is preferably used so that the solder bead is formed entirely by the solder which remains unsolidified or incompletely solidified when acted on by the finishing flame(s), the process can be used for finishing or improving a bead which has already been formed in the corner angle by the same or some other process. For example the invention includes a process in which an initial solder bead is formed in the corner angle by means of a soldering iron and in which further solder is subsequently supplied into the joint angle and acted upon by a finishing flame in accordance with the invention so as to form a layer of solder on top of the initial bead. In that case the initial bead does not have to meet stringent specifications and it can be very rapidly formed. It is also possible for a sheet and spacer strip to be initially connected by spots of solder to spaced positions along the joint preparatory to the formation of a solder bead along the joint angle by a process according to the invention.

In certain processes according to the invention, the solder which is acted on by the finishing flame is supplied to or spread along the joint angle via or by means of a soldering iron. For example solder metal may be melted in situ by a soldering iron. To this extent the process may be similar to a conventional soldering process but the conventional process is departed from in that the solder head is acted upon by a flame or flames (the finishing flame or flames) before the solder metal has solidified or cooled and the form which the solder bead finally takes is dependent on the influence of such flame(s). The finishing flame(s) improves the wetting of the faces defining the joint angle by the solder metal and this is one reason why the finishing flame or flames assists or assist the formation of a bead of correct cross-sectional shape having a concave exposed surface merging with the said faces.

Although as already mentioned an initial solder bead may be formed and then completed or improved by performing a process according to the invention it is generally speaking unnecessary for such an initial bead to be formed. It is in fact an important advantage of the process according to the invention that it enables a solder bead of very satisfactory quality to be produced by a single pass of a soldering iron and a finishing flame or flames. The elimination of any need for a second pass of the soldering iron and for the supply of soldering flux has very important beneficial consequences in terms of production costs. One reason for this economy, apart from the saving in the costs of soldering flux and operations which the use of such material entails is that finished joints between one glass sheet and the spacer strip or strips can be formed before the second sheet is soldered to such strips when using a production procedure which involves connection of the spacer strip or strips to the first sheet and then inversion of the work preparatory to soldering the second sheet to such strip(s). When using the known soldering processes wherein the formation of the final joints requires the production of initial tacking beads followed by one or more further passes of a soldering iron it has been the practice to use a procedure which involves connection of the spacer strip(s) to the first sheet by initial beads, inversion of the work, soldering of the second sheet to the said strip(s) using two passes of the soldering iron along each joint to form a final bead, and re-inversion of the work to complete the solder bead joints between such strip(s) and the first sheet.

It is not essential to use a soldering iron for melting metal in situ or for directly spreading solder metal along the joint angle. The supply of the solder along the joint angle may be achieved in some other way. For example, molten solder may be caused to flow onto a soldering iron which is heated to keep the solder molten and is placed so as to cause the molten solder to flow from the iron into the joint while the iron and the work are relatively displaced to cause progressive formation of the solder bead. As another example, the joint may be supplied with molten solder by melting a solid solder bead in situ by induction heating. As yet a further example, a continuous stream of solder may be discharged directly into the corner angle from an adjacent orifice while such orifice and the work are relatively displaced substantially parallel with the line of the joint. A said orifice may be spaced from the work so that the solder stream follows a free trajectory leading into the joint angle. Alternatively the orifice may be located in the joint angle. Thus, the solder may be caused to flow along a conduit the discharge end of which makes contact with the work in the joint angle. By supplying the joint with molten solder without using a soldering iron the advantage is achieved of a saving in the costs involved in replacing the soldering iron, which is usually made of copper and is rather rapidly corroded by some of the soldering metals used. Moreover the risk of impairing the mechanical strength of the solder bead due to dissolution of metal of a soldering iron, e.g., copper, in the solder metal, is avoided.

In some cases according to the invention, the solder metal is spread along the joint angle by means of a soldering iron and at each position along the joint line the solder metal is acted upon by a flame or flames simultaneously with the contact by the soldering iron as well as subsequently by the finishing flame(s). By acting upon the solder by a flame or flames at the time the solder is contacted by the soldering iron, the flow of solder metal into intimate contact with the joint faces is promoted.

Preferably the flame or flames to which the solder metal is exposed is or are a reducing flame or flames. By using such a flame the risk of impairment of the joint due to oxidation of the solder metal is avoided. The presence of oxides is liable to impede wetting of the joint faces by the solder metal and to weaken the joint due to the occlusion of such oxides in the bead. A reducing flame can also be used prior to the supply of solder in order to eliminate any oxides which may be present on the metallization coating and/or on the spacer member or members.

Advantageously, the bead is formed without using a soldering flux. By eliminating flux the process is rendered cleaner and cheaper due to savings in material and labor. When flux is used, as it must be in the conventional soldering process involving repeated passes of a soldering iron, corrosion of the spacer strip or strips or the metallized surfaces of the glass sheets is liable to set in under the activating action of flux residues when the glazing unit is exposed to water or a humid atmosphere.

The progressive formation or completion of a bead by a process according to the invention involves a relative displacement, substantially parallel with the line of the joint, between the work (comprising the spacer strip and sheet defining the corner angle) on the one hand and a source of supply of solder metal and the finishing flame(s) on the other hand. Such relative displacement may comprise a displacement of the said source, the soldering iron (if used) and the finishing flame(s) while the work is stationary, a displacement of the work while said source, iron (if used) and flame are stationary or displacement of both these elements and the work. The relative displacement is preferably continuous and at uniform speed.

Preferably the sheet and spacer strip defining the corner angle are displaced parallel with the line of the joint and the source of supply of the solder metal, together with the iron (if used) and the source of the finishing flame(s) are fixed.

Preferably the solder metal is progressively supplied or spread along the joint with the aid of a soldering iron which is displaced manually along the joint whereas the finishing flame(s) is or are mechanically displaced and guided along the joint. In this manner of applying the invention, use is made of manual skill in manipulating the soldering iron, which is very desirable for optimum results, particularly at the corner regions of the glazing unit, whereas the location of the finishing flame or flames in relation to the work is maintained at a predetermined setting to achieve the best finishing effect.

The invention includes apparatus for use in manufactuing glazing units using a process according to the invention as hereinbefore defined. Apparatus according to the present invention, for use in the manufacture of glazing units by jointing metallized margins of sheets of glass to an intervening spacer strip or strips by means of solder beads formed along the sheet-to-strip joints, such apparatus comprising a work support and means for acting progressively along a said joint for forming said bead, is characterized in that said bead-forming means comprises a combination of elements for acting progressively along a said joint in succession, such elements comprising at least one element for providing the joint angle with molten solder, and a gas burner for maintaining at least one flame playing onto the joint, and in that means is provided for relatively displacing said support and the elements of said combination so as to cause every increment of length of the joint to be traversed by at least one said flame after such increment has been traversed by the or each other element of said combination and before the solder metal at that increment of length of the joint has completely solidified.

By using such an apparatus according to the invention, solder beads of high quality can be more easily and reliably formed than by apparatus as previously known. This advantage is due to the construction of the apparatus for maintaining a finishing flame.

In certain apparatus according to the invention the said combination of elements includes a solder feeding element for feeding solder into the joint angle in molten condition. The provision of such an element enables molten solder to be fed into the joint angle along its length, e.g., so that the molten solder feeds into the joint angle at a position maintained just ahead of the finishing flame(s). This is sometimes preferable to the procedure of first laying solder along the joint and subsequently melting such solder in situ and subjecting the melted solder to the action of said finishing flame(s). However the invention includes apparatus for carrying out that alternative procedure, as hereinafter specified.

Advantageously, said combination of elements includes a soldering iron. By using a soldering iron solder supplied to the joint can be spread along the joint in a very satisfactory way to promote the formation of a bead of correct form.

The invention includes apparatus in which the said combination of elements includes at least one gas burner for maintaining at least one flame playing onto the joint at the position where it is acted on by a said soldering iron as well as for maintaining at least one flame (finishing flame) playing onto the joint at a position trailing the soldering iron. By supplementing the action of a soldering iron by the action of a flame acting at the same place as the iron the flow of solder metal into intimate contact with the joint faces is promoted.

In some embodiments of apparatus according to the invention, the element for providing a joint with molten solder is an element for progressively melting solid solder metal in situ. Such an apparatus has certain advantages. In particular, it may be employed for carrying out a process according to the invention in cases where an initial solder bead has already been formed in the joint angle, possibly very rapidly so that the bead does not yet have the required final form or quality. The element for melting the solder metal in situ may, e.g., be in the form of an induction heating device.

The invention includes apparatus in which the elements of said combination are displaceable as a unit relative to said work support. Such an apparatus is valuable in circumstances in which for reasons of space limitations or otherwise it is not convenient to use a conveyor or other travelling work support. The movement of the combination elements may be effected via regulatable speed control means.

Preferably the apparatus comprises means for forming an air cushion for temporarily supporting the work off the said work support in order to facilitate manipulation of the work into a required position, e.g., in order to bring an edge of the work against an edge guide.

Certain embodiments of the invention, selected by way of example, will now be described with reference to the accompanying diagrammatic drawings, in which.

Figure 1:
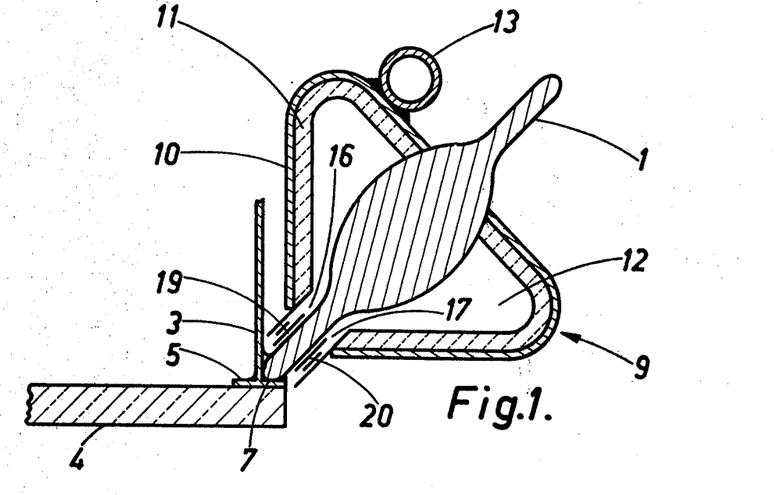
FIG. 1 is a cross-sectional end view of part of an apparatus according to the invention, comprising a soldering iron and gas burner assembly which is shown in cross-section on the line I—I in FIG. 2.
Figure 2:
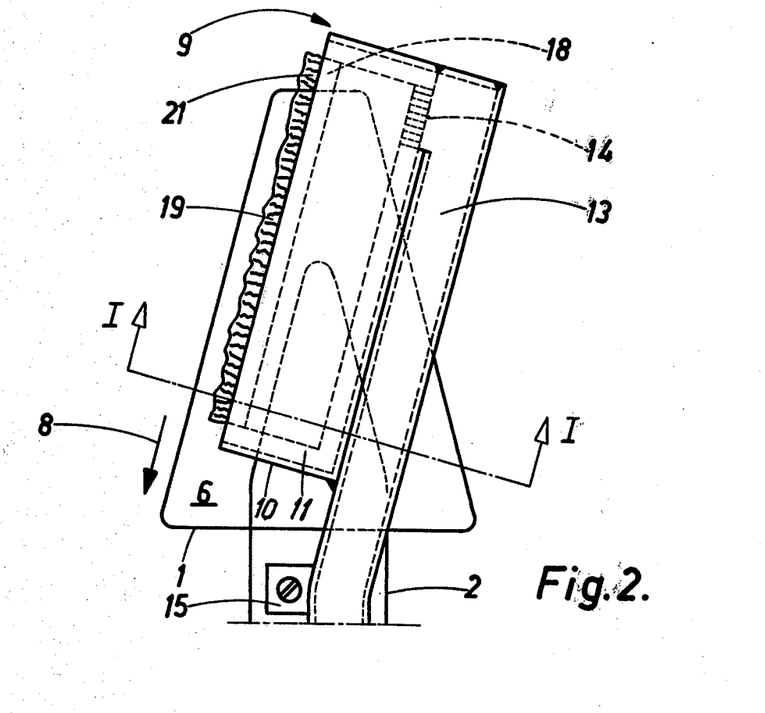
FIG. 2 is a plan view of part of the said assembly.

The apparatus illustrated in FIGS. 1 and 2 comprises a soldering iron 1 of known kind, for instance, an internally electrically heated iron, provided with a handle 2. In FIG. 1 the iron is shown in operative position in relation to parts of a glazing unit which are being jointed together by a solder bead. The parts in question comprises a spacer strip 3 and a glass sheet 4. The solder bead is formed in the corner angle between the spacer strip and a metal coating 5 on the said glass sheet. The metal coating usually comprises a layer of an alloy, mainly composed of copper, applied onto the glass. Preferably this metal layer is covered by a layer of solder metal, e.g., a lead-tin alloy. The spacer strip may comprise a ribbon of a lead-based alloy, which ribbon is preferably coated with solder metal composed of lead, tin and bismuth.

Solder metal composed, e.g., of lead and tin, is fed to the soldering iron 1 at the zone 6 and becomes spread along the joint angle to form a solder bead 7 as the soldering iron is displaced along the line of the joint in the direction indicated by arrow 8 in FIG. 2.

The soldering iron forms part of an assembly which also includes a gas burner head 9 comprising an envelope 10 made, for example, of refractory steel which is internally protected by a refractory ceramic lining 11. The interior chamber 12 of the gas burner head communicates with the interior of a combustible gas feed tube 13 via multiple small apertures 14 in the refractory lining 11. The feed tube 13 is welded to the envelope 10 and is also connected, as for example by a bracket 15 to the handle 2 of the soldering iron. The said tube 13 can be connected via a flexible conduit to a source of combustible gas under pressure.

The soldering iron protrudes through a slot in the head 9 and partitions this slot into two gas discharge paths 16, 17 located on opposite sides of the soldering iron. However, the iron does not extend as far as the end of the slot which is remote from the handle 2 so that an end portion 18 of the slot is not partitioned by the iron and at this position combustible gas discharges in a stream occupying the full width of the slot. The combustible gas issuing from the bas burner head is ignited so that flame portions 19 and 20 are directed toward the work along the upper and lower faces respectively of the iron, and a flame portion 21 originating from the slot portion 18 is directed toward the work at a position immediately behind the soldering iron.

As the soldering iron and burner head assembly is displaced along the joint angle in the direction indicated by arrow 8, the flame portions 19 and 20 act on the solder bead as it is being contacted by the iron and assist the flow of solder metal into intimate contact with the joint faces, thereby promoting the formation of a bead of the required form. After the trailing end of the iron leaves any given portion of the length of the solder bead that portion is acted upon by the flame portion 21. This flame portion leaves the solder metal in a certain molten condition and the final bead forms by solidification of the solder metal from that molten condition. Thus the flame portion 21 constitutes a finishing flame in accordance with the invention. The solder bead is free from inclusions and has a curved surface which merges tangentially with the faces of the spacer strip and metallized surface defining the corner angle.

In a modification of the process just described, a soldering iron/burner head assembly was used which was similar to that described with reference to FIGS. 1 and 2 save in that the combustible gas could discharge only from the zone 18. The solder metal was therefore not acted upon by flames directed along the upper and lower faces of the iron in the same way as the flame portions 19, 20, but only by a flame 21 issuing from the zone 18 immediately behind the iron. It was found that the finishing flame still had a very beneficial effect in promoting the formation of a good quality solder bead.

The combustible gas may for example be hydrogen, acetylene, propane, butane, methane or coking gas. The combustible gas is preferably mixed with a considerable proportion of a non-combustible gas, e.g., nitrogen, argon or carbon dioxide. The supply of gas may also include oxygen; otherwise the fuel gas burns by means of atmospheric oxygen. The required composition of the gas fed to the burner head is advantageously obtained by mixing the selected combustible gas with air and then adding a non-combustible gas if required. The fuel gas composition may be required to have a fairly low calorific value, in order to avoid overheating of the spacer strip 3 and the glass sheet 4. When using a mixture of combustible gas and air and/or oxygen, the amount of air and/or oxygen is preferably controlled so that the gas mixture burns to form a flame with a slight reducing action.

An example of a suitable combustible gas mixture is one comprising 3% by weight of propane and an amount of air providing sufficient oxygen for burning 80% of the propane, the remainder being nitrogen.

The handle 2 of the soldering iron may be provided with a switch for controlling a gas flow control valve whereby the supply of fuel gas to the burner head can be shut off or substantially restricted when bead-forming displacement of the soldering iron is interrupted or terminated, e.g., on reaching the end of a joint angle at the corner of the glazing unit. It is preferable for the supply of combustible fuel gas not to be completely shut off at such times but rather to be restricted to a very low rate, sufficient to maintain a stable flame.

During the forming of the solder bead along each margin of the work, the work is supported by a work support and is continuously or intermittently displaced relative to the soldering iron/burner head assembly to cause the bead to be formed progressively along the line of the joint. After forming a bead along one margin of the work it is turned in the horizontal plane into a position for formation of a solder bead along another margin. Instead of displacing the work during the formation of each bead, the work may remain stationary on the work support and the said assembly can be displaced relative to the work. In either case the assembly can be manually or mechanically held.

After securing the spacer strip 3 to the glass sheet 4 along the whole margin of the sheet the work is inverted and the free edge of the spacer strip is secured to a second glass sheet so that the spacer strip connects the two sheets in spaced parallel relationship.

Figure 3:
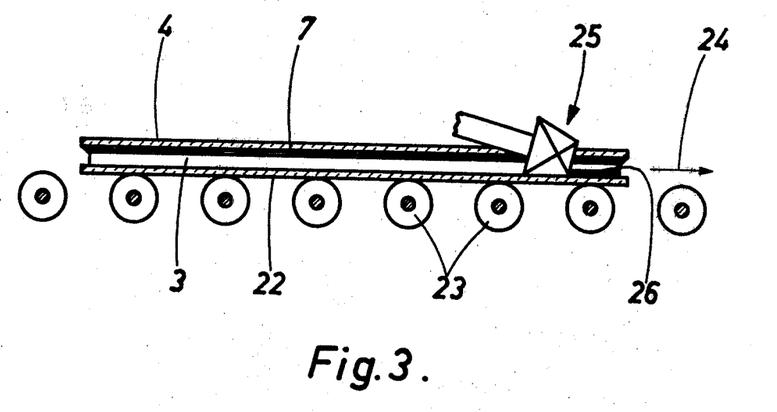
FIG. 3 is a side elevation of an apparatus similar to that which is the subject of FIGS. 1 and 2.

FIG. 3 illustrates the second glass sheet 22 in course of being connected to the spacer strip 3. It will be noted that the sheet 4 and the connected spacer strip 3 have been inverted with respect to their orientation in FIG. 1 so that the joint angles in which the solder beads have to be formed for connecting the sheet 22 to the spacer strip have the same orientation in relation to the soldering iron/burner head assembly as in FIG. 1.

FIG. 3 shows the work support, which is in this case a conveyor comprising a plurality of rollers 23. The rollers are rotated to cause the work to travel in the direction of arrow 24 past the soldering iron/burner head assembly 25 which can be the same assembly as that used in FIG. 1 or an assembly which is identical with it. In this way a solder bead 26 is formed between the spacer strip 3 and the lower sheet 22.

Figure 4:
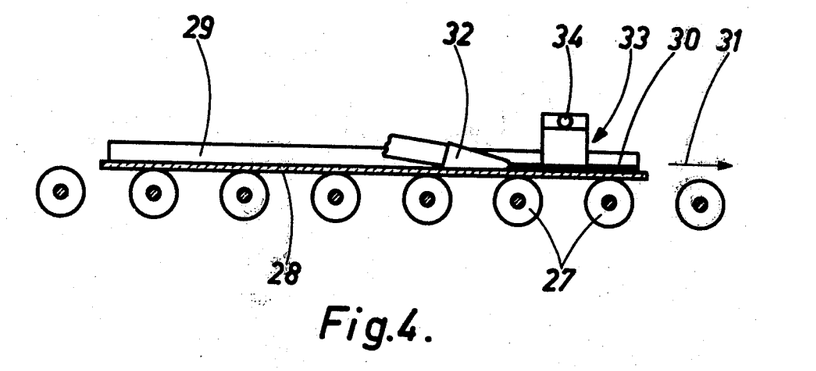
FIG. 4 is a side elevation of parts of a further apparatus according to the invention.

In the apparatus shown in FIG. 4 there is a work-supporting conveyor comprising a plurality of rollers 27. The conveyor is shown supporting a glass sheet 28 to which a spacer strip 29 is being connected by a solder bead 30 during conveyance of the work in the direction of the arrow 31. In this embodiment the solder metal is fed to the joint angle and is spread therealong by an ordinary manually held soldering iron 32. Adjacent the soldering iron a gas burner head 33 is mounted. The burner head comprises a ceramic-lined chamber similar to that which forms the burner head 9 shown in FIGS. 1 and 2. Combustible gas is supplied into the chamber via an inlet 34 and the gas is burned on issue from the gas discharge slot. The gas flame acts on the solder metal immediately after it ceases to be contacted by the soldering iron 32, before the solder metal has completely solidified, and as a result of the action of the flame a bead of very good form can be very easily produced. Satisfactory results were obtained by orientating the burner head so that the direction of the flame originating from the gas discharge slot is substantially at 45° to the faces defining the joint angle. The actual spacing of the gas discharge slot from the work is not highly critical so that even if spacer strips have to be soldered to sheets of glass of different thicknesses travelling in succession past the soldering iron and burner head it is not necessary for the height of the burner head to be adjusted and it can therefore be mounted in a fixed position.

There is an advantage in holding the soldering iron manually because of the problem of properly manipulating the iron at the corners of the work. However the soldering iron can be mechanically supported and if desired its height can be automatically varied in dependence on changes in glass sheet thickness from one glazing unit to another, e.g., by connecting the soldering iron to a feeler which rides in contact with the upper face of each glass sheet as it passes the soldering station.

Instead of mounting the soldering iron and burner at a given position in relation to the length of the work support, the soldering iron and burner head can be mounted on a guideway or guideways to permit either or both of them to be displaced manually or automatically along the work. In such a case, soldering iron and burner head mountings can be as hereinafter described with reference to FIGS. 5 and 6. Also as described with reference to those figures, the soldering iron and burner head may be connected together for movement as a unit in tandem along the work.

Figure 5:
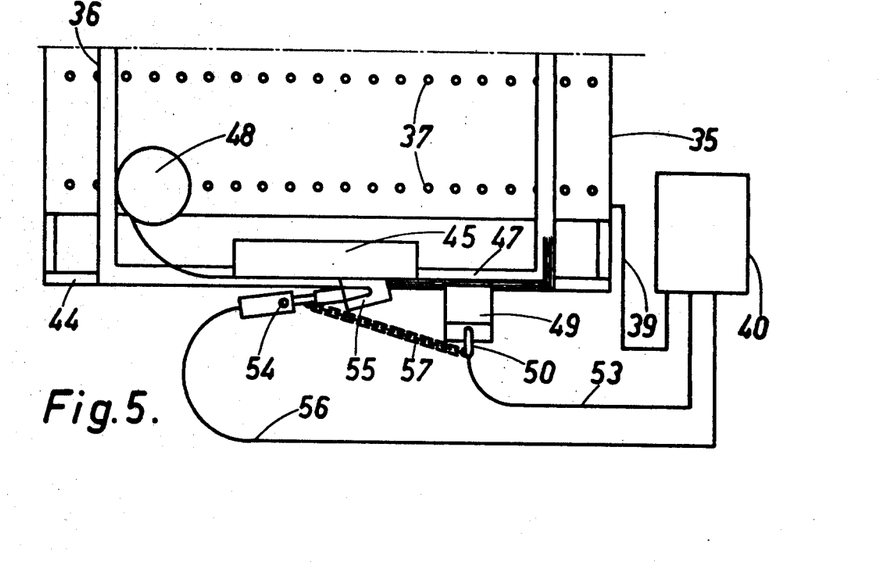
FIG. 5 is a plan view of another apparatus according to the invention.
Figure 6:
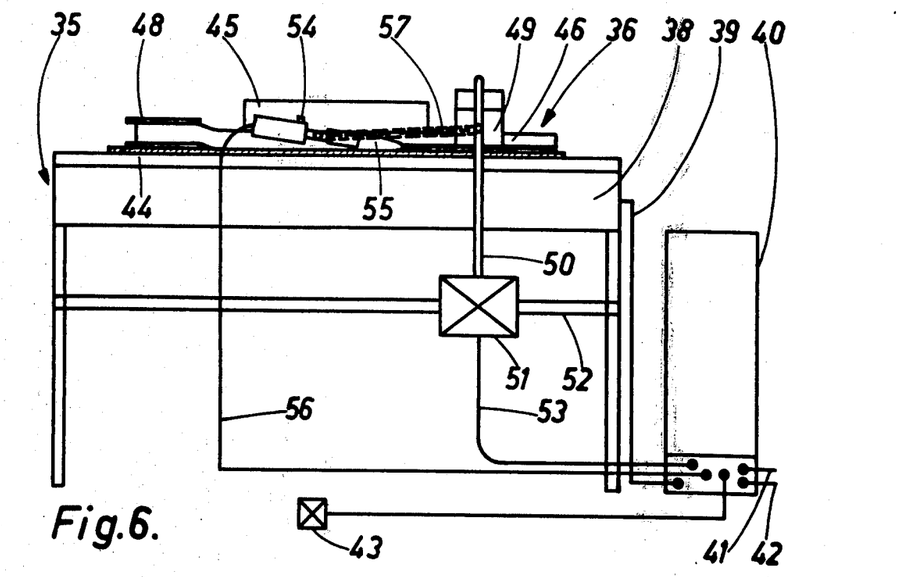
FIG. 6 is a side elevation of the apparatus illustrated in FIG. 5.

Reference is now made to the embodiment of the invention illustrated in FIGS. 5 and 6. The apparatus employed in this embodiment comprises a work-supporting table 35 on which a glass sheet 36 which is to form part of a glazing unit is supported horizontally. The top of the table is formed with perforations 37 which communicate with an air chamber 38 beneath the table top. This chamber is connected by an air line 39 with a control unit 40 to which is connected an electrical power supply line 41 and an air line 42 connected to a source of air under pressure. A switch 43 enables air under pressure to be released at any required time into the chamber 38. When the chamber is thus pressurized, air escaping through the perforations 37 in the table top forms an air cushion which supports the work off the table and enables the work to be easily displaced by a workman into a required position in relation to the table. Normally the air cushion is only brought into operation when it is desired to displace a glass sheet to bring one edge thereof into abutment with an edge guide 44 or to turn the glass sheet in its own plane following the completion of a solder bead along one margin of the work, in order to bring another edge of the sheet against the edge guide preparatory to forming a solder bead along another margin. After the sheet has thus been correctly positioned, the air supply to the chamber 38 is cut off so that the work is firmly supported by the table top during the actual solder bead forming operations.

A ribbon guiding device 45 is provided which serves to guide a continuous ribbon 46 into correct position in relation to the metallized margin 47 of the glass sheet 36; normally into a position centrally of the width of such margin. The spacer ribbon is drawn from a reel 48. Any strip guiding means known per se can be used for guiding the spacer ribbon.

The elements for forming the solder beads comprise a gas burner head 49 which may be similar to the gas burner head shown in FIGS. 1 and 2 but without the soldering iron fitted thereto. The burner head 49 is supported by a rigid gas feed tube 50 which is carried by a carriage 51 mounted for sliding movement along a guide rail 52 which may for example be formed by a square section tube. A flexible gas supply conduit 53 connects the tube 50 to the control unit 40. The feed of combustible gas to the burner head 49 is preferably controlled by an electrically operated valve which operates to cut off the greater part of the combustible gas supply to the burner head 49 in response to actuation of a manually operated switch when the solder bead forming operation is interrupted or terminated, e.g., at the end of the spacer ribbon course along one margin of the glass sheet 36. The electrically controlled valve may be fitted in one of two parallel gas flow paths to the burner head and the other of such flow paths may be provided with a manually controlled valve which is set so that when the electrically controlled valve is closed the supply of combustible gas to the burner head remains sufficient to maintain a stable flame. The switch for operation the electrically controlled valve is designated 54 and it is mounted on the handle portion of an electrically heated soldering iron 55. The switch 54 is connected to the control unit 40 via a flexible conductor lead 56.

The burner head 49 and its connected gas feed tube 50 and the carriage 51 are connected by a chain 57 to the soldering iron 55 so that as the soldering iron is displaced by an operator, along the margin of the work, the soldering iron entrains the gas burner head and the gas flame issuing from this head acts on the bead of solder metal before it has completely solidified. The burner head is orientated so that the direction of the flame is substantially 45° to the faces defining the joint angle.

A suitable fuel gas composition is one comprising a mixture of methane with 90% of the air required for its complete combustion.

Figure 7:
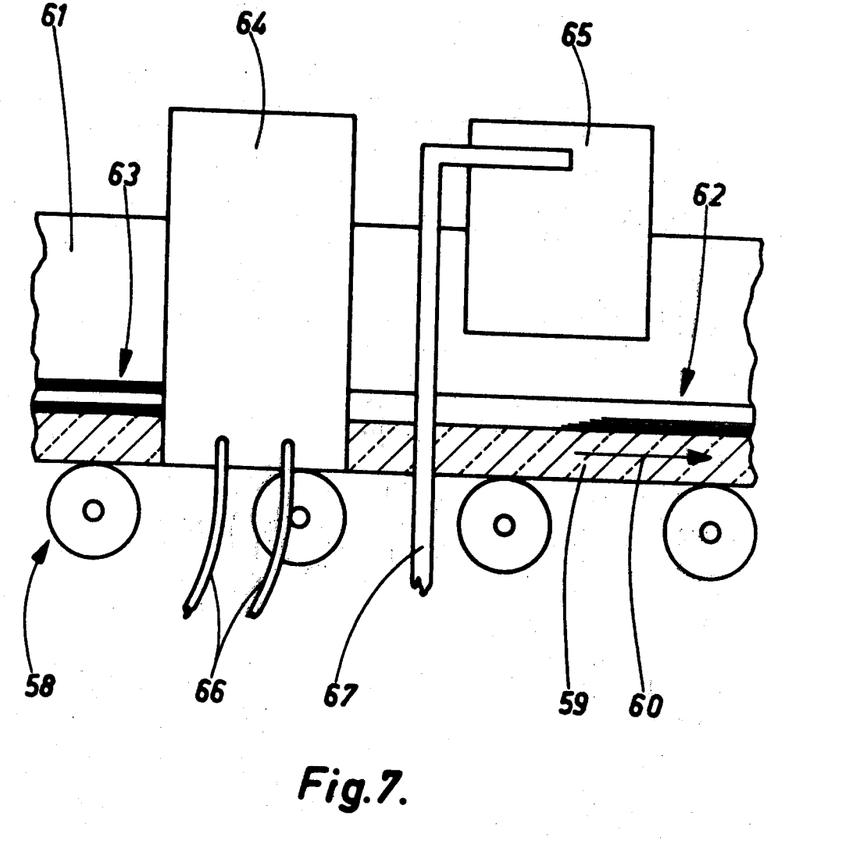
FIG. 7 is a side elevation of another apparatus according to the invention.

FIG. 7 illustrates another embodiment of apparatus according to the invention. This apparatus includes a work support in the form of a roller conveyor 58 for conveying a glass sheet 59 in the direction of arrow 60 during the operation of soldering a spacer strip 61 to the glass sheet by means of a solder bead 62. The spacer strip 61 is made of copper. The apparatus is designed for forming the final solder bead 62 from solder metal 63 which is already present in solid form in the joint angle between the glass sheet and the spacer strip. The solder metal 63 may for example form an initial solder bead rapidly formed by means of a soldering iron for connecting the spacer strip to the glass sheet. Alternatively the solder metal 63 may be in the form of a solid strip which is simply laid into the joint angle. In order to form the final bead the work is conveyed by the conveyor 58 past a soldering station comprising an induction heating unit 64 and a gas burner head 65. The induction heating unit 64 is connected to a source of E.M.F. via conductor leads 66. As the solder metal 63 passes the induction heating unit 64 the solder metal is melted by induction heating current and flows into intimate contact with the joint faces. The melted solder metal is acted upon before the solder metal has solidified by the gas flame which issues from the gas burner head 65 so that a good quality final bead 62 is formed in accordance with the invention. The gas burner head is supplied with a combustible gas mixture via feed pipe 67 and may be constructed similarly to the gas burner head represented in FIGS. 1 and 2 but without the soldering iron fitted to it.

While the invention has been particularly described as applied to the manufacture of double glazing units, it is to be understood that a process or apparatus according to the invention can be used in the manufacture of glazing units comprising more than two sheets of glass held in spaced relationship by intervening spacer strips.

I claim:

1. In a process for manufacturing a glazing unit by jointing a metallized margin of a sheet of glass to any intervening spacer strip following a course along the peripheral margin of the unit in which the joint between said sheet and said strip along at least a section of such course is formed by applying solder into the corner angle between said sheet and said strip to form a solder bead along said section, the improvement comprising the steps of progressively melting and spreading with a soldering iron solder metal along the joint angle and progressively transversing the joint by at least one finishing flame so that at each moment during its progress along the joint such finishing flame acts on such solder metal before it has completely solidified whereby a final bead is formed by solidification of solder metal from the molten condition in which it is left by such finishing flame, which bead has a curved surface which merges tangentially with the faces of the spacer strip and metallized margin defining the corner angle.

2. A process according to claim 1 characterized in that at each position along the joint line the solder metal is acted upon by at least one additional flame simultaneously with the contact by the soldering iron as well as subsequently by the first-mentioned finishing flame.

3. A process according to claim 1 characterized in that the finishing flame to which the solder metal is exposed is a reducing flame.

4. A process according to claim 1 characterized in that the solder bead is formed without using a soldering flux.

5. A process according to claim 1 characterized in that the sheet and spacer strip defining the corner angle are displaced parallel with the line of the joint and the source of supply of the solder metal and the source of the said finishing flame are fixed.

6. A process according to claim 1 characterized in that the soldering iron is displaced manually along the joint and said finishing flame is mechanically displaced and guided along the joint.

7. In a process for manufacturing a glazing unit by jointing a metallized margin of a sheet of glass to any intervening spacer strip following a course along the peripheral margin of the unit in which the joint between said sheet and said strip along at least a section of such course is formed by applying solder into the corner angle between said sheet and said strip to form a solder bead along said section, the improvement comprising the steps of progressively melting by induction heating solder metal along the joint angle and progressively transversing the joint by at least one finishing flame so that at each moment during its progress along the joint such finishing flame acts on such solder metal before it has completely solidified whereby a final bead is formed by solidification of solder metal from the molten condition in which it is left by such finishing flame, which bead has a curved surface which merges tangentially with the faces of the spacer strip and metallized margin defining the corner angle.

* * * * *